United States Patent [19]

Anzini

[11] Patent Number: 5,073,598

[45] Date of Patent: Dec. 17, 1991

[54] METHOD FOR IMPROVING THE PROCESSING CHARACTERISTICS OF POLYETHYLENE BLENDS

[75] Inventor: David J. Anzini, Sodus, N.Y.

[73] Assignee: Mobil Oil Corporation, Fairfax, Va.

[21] Appl. No.: 369,170

[22] Filed: Jun. 21, 1989

[51] Int. Cl.$^5$ .................... C08L 23/26; C08L 51/06; C08J 5/18

[52] U.S. Cl. .................................. 525/193; 525/194; 525/197; 525/240

[58] Field of Search ................................. 525/194, 193

[56] References Cited

U.S. PATENT DOCUMENTS

| | | | |
|---|---|---|---|
| 4,226,905 | 10/1980 | Harbourne | 526/348.1 |
| 4,460,750 | 7/1984 | Thiersault et al. | |
| 4,465,812 | 8/1984 | Moriguchi et al. | |
| 4,578,421 | 3/1986 | Shaw et al. | |
| 4,603,173 | 7/1986 | Mack et al. | 525/193 |
| 4,614,764 | 9/1986 | Colombo et al. | |
| 4,737,547 | 4/1988 | White | 525/193 |

*Primary Examiner*—Carman J. Seccuro
*Attorney, Agent, or Firm*—Alexander J. McKillop; Charles J. Speciale; Michael J. Mlotkowski

[57] ABSTRACT

A method for improving the processing characteristics of a polyethylene blend comprised of at least two polyethylene components having at least one dissimilar rheological property. The method comprises the steps of (a) establishing a functional relationship between free radical generator dosage and a rheological property for at least one polyethylene component of the polyethylene blend; (b) determining a free radical generator dosage from said relationship for use with at least one polyethylene component, said dosage level sufficient to enable the polyethylene component so treated to exhibit a rheological property substantially similar to that of all components present in the blend; (c) treating at least one polyethylene component at the dosage of free radical generator determined in step (b); and (d) blending the polyethylene components in melt form. A process for the extrusion of films from blends of polyethylenes is also provided.

18 Claims, No Drawings

METHOD FOR IMPROVING THE PROCESSING CHARACTERISTICS OF POLYETHYLENE BLENDS

FIELD OF THE INVENTION

The present invention relates to a method for improving the processing characteristics of polyethylene blends and, more particularly, to a method useful when at least one polyethylene blend constituent exhibits a rheological property which differs from other blend constituents.

Background of the Invention

Polyethylenes are high molecular weight polymers with structures that are partially crystalline and partially amorphous. The degree of crystallinity depends upon the branching of the polymer chain. The density of polyethylenes generally ranges from 0.89 to 0.96 g/cm$^3$.

Many classes of ethylene polymers are presently known and used. High pressure, low density polyethylene (LDPE), produced by the free radical polymerization of ethylene at high temperature, is distinguished by its highly branched structure, having both short and long chain branches. Low pressure, high density polyethylene (HDPE), produced by the polymerization of ethylene utilizing catalysts of the Ziegler-Natta type, is characterized by the linearity of the polymer chain and the lack of side-chain branches. The density of an HDPE copolymer generally ranges from 0.941–0.959 g/cm$^3$, while an HDPE homopolymer will have a density of at least 0.960. Still another type of ethylene polymer is linear low density polyethylene (LLDPE). This type encompasses any ethylene-alpha-olefin copolymer prepared by a low pressure process. Densities range from 0.910–0.940 g/cm$^3$ for LLDPE. The alpha-olefin is usually present in amounts less than 20%; with butene, hexene, methyl-pentene, octene or decene typically used. LLDPE is produced by the polymerization of ethylene in the presence of the comonomer using a catalyst of the transition metal/aluminum alkyl type. The resultant polymer has a linear structure, with long sequences of methylene units having periodic, uniform side chains. Such short chain branching interferes with the crystallization of the main chains; and, because the crystalline regions display a higher density than the amorphous regions, a lower density results.

The differences in the nature and amount of short-chain and long-chain branching of LLDPE and LDPE affect both physical properties and melt rheology. LLDPE generally exhibits higher tensile strength, improved environmental stress crack resistance (ESCR), a higher melting point, higher flexural modulus and better elongation. The melt rheology differs in that at a given melt index and density, LLDPE displays a higher viscosity which is found to decrease less rapidly than that of LDPE.

Molecular weight, molecular weight distribution and molecular structure are factors influencing the degree of viscosity decrease of the polymer. Broad molecular weight distribution and long-chain branching are related to enhanced shear thinning in the shear rate range used in resin extrusion. These factors combine so that conventional LDPE exhibits a more marked decrease under shear than LLDPE which is characterized by its relatively narrow molecular weight distribution and short chain branching. Other rheological differences between LDPE and LLDPE are found in the polymers during elongation. The elongation viscosity of LDPE increases with increasing shear rate; that is, the resin is said to be strain hardening. LLDPE, however, exhibits relatively little strain hardening. These differences in rheology may be expressed in simple terms by stating that compared to LDPE, LLDPE is stiff in shear and soft in extension. These and other differences between these polymers are described in greater detail in U.S. Pat. No. 4,243,619 and in the article "Film Extrusion of Low Pressure LDPE", Fraser, W. A. et al, TAPPI 1980 (1980 TAPPI Paper Synthetics Course Proceedings), to which reference is made for such details.

One type of fabrication process which may be used with the various types of polyethylenes is the blown film process in which a molten tube of the resin is extruded, generally in a vertically upwards direction to a set of nip rolls, usually about 2 to 7 meters above the extrusion die. A free standing bubble is formed by the injection of air into the interior of the bubble, this internal pressure serving to expand the tube by about two to five times its original diameter and to confer a transverse direction (TD) molecular orientation on the film. At the same time, a longitudinal or machine direction (MD) orientation is created by taking up the cooled film through the nip rolls at a speed greater than the extrusion speed. After passing through the nip rolls, the film may be cooled further and rolled up or passed to further processing steps, e.g. slitting and forming. The blown film process is described in further detail in *The Encyclopedia of Chemical Technology*, Kirk-Othmer, Third Edition, John Wiley & Sons, New York, 1981, Vol. 16, pp. 416–417, and Vol. 18, pp. 191–192, to which reference is made for details of the process.

Other types of fabrication processes which may be used with polyethylenes include the cast-film process, the sheet extrusion process, as well as the various coating and molding processes known to those skilled in the art. Details of these processes are discussed in *The Encyclopedia of Chemical Technology*, Kirk-Othmer, Third Edition, John Wiley and Sons, New York, 1982, Vol. 18, pp. 192–199, the contents of which are incorporated by reference in their entirety.

The various rheological differences impact processing in several significant ways. For example, some equipment used to fabricate LDPE may be unsuitable in some instances for processing LLDPE at commercially acceptable rates. It is known that in the fabrication of films by the blown tubular film process, the strain hardening behavior imparts good bubble stability to the process; that is, the polymer is said to have good melt strength and the film may be extruded at commercially satisfactory speeds. One particular problem encountered when substituting as a blend constituent an LLDPE for an LDPE in the blown film process is that bubble stability may suffer due to lower melt strength. This imposes a constraint upon the speed with which LLDPE-containing blends can be extruded into a film and generally, it has been found necessary to operate such blown film operations at speeds which are lower than those which can be used with the high pressure polymer. Similar constraints may also arise in slot cast film production, again limiting the extrusion speeds which can be commercially employed. This is obviously undesirable from an economic point of view and it would be desirable to increase the melt strength of the LLDPE constituent in order to permit the blend to be made into a film at higher speeds.

U.S. Pat. No. 4,578,431 provides a process for improving the melt strength of LLDPE by pretreating the polymer in melt form at a temperature of at least 230° C. in the presence of an organic peroxide for a period of time equal to at least three times the half-life of the organic peroxide at the melt temperature. It is disclosed that such treatment improves bubble stability in blown film extrusion when compared to like polymers not so treated. U.S. Pat. No. 4,578,431 is hereby incorporated by reference in its entirety.

U.S. Pat. No. 4,614,764 proposes that the processing characteristics of LLDPE be improved by adding a chemically modified ethylene polymer to a base resin. The modified polymer is formed by taking a portion of the base resin and treating it with a free radical generator which is preferably an organic peroxy compound such as benzoyl peroxide. The use of the modified polymer masterbatch is said to improve the melt strength of the overall blend, providing greater bubble stability when blowing films from such blends. The optional use of an unsaturated silane, such as vinyl trimethoxy silane, is disclosed. U.S. Pat. No. 4,614,764 is hereby incorporated by reference in its entirety.

Another proposal for improving the properties of LLDPE with organic peroxides is described in U.S. Pat. No. 4,460,750. In this case, the improvements achieved are stated to be in the transparency of the film. Other treatments for LLDPE using peroxides and unsaturated silane compounds to promote crosslinking in order to form improved wire coating materials are described in U.S. Pat. Nos. 4,320,214; 4,289,860; 4,228,255; 4,117,195 and 3,646,155.

While the aforementioned disclosures address the need to improve certain characteristic properties of LLDPE resins to permit them to be used in place of the more traditional resins, other significant problems have remained unsolved. One such problem is often encountered when attempting to process films and sheets comprised of blends of polymers having unlike rheological properties. This problem is particularly pronounced in the aforementioned blown film extrusion process where it is known that the use of such blends often results in a lack of bubble stability. In addition to reduced line speed, poor bubble stability often results in bubble breakage which is a chief cause of significant downtime—especially when seeking to process blends of unlike rheological properties.

Although one solution would be to avoid the use of resin blends in sensitive processes and employ straight virgin resin, such blends are often desirable from the standpoint of resin cost or the need to impart some advantageous property to the resultant product. Further, it is often highly advantageous to use blends which include recycled polymer which, while being relatively inexpensive to purchase, may comprise a blend of any number of relatively unknown polymeric materials. Such recycled resins are generally produced with little effort to control the rheological properties of the end product and, as such, their use can create special processing problems.

Therefore, what is needed is a method to improve the processing characteristics of a blend of polyethylene materials of unlike rheological properties.

SUMMARY OF THE INVENTION

According to the present invention there is provided a method for improving the processing characteristics of a polyethylene blend wherein the blend is comprised of at least two polyethylene components having at least one dissimilar rheological property, comprising the steps of: establishing a functional relationship between free radical generator dosage and a rheological property for at least one polyethylene component of the blend; determining a free radical generator dosage from said relationship for use with at least one polyethylene component, said dosage level sufficient to enable the polyethylene component so treated to exhibit a rheological property substantially similar to that of all components present in the blend; treating at least one polyethylene component at the dosage of free radical generator so determined; and, blending the polyethylene components in melt form. A process for extruding polyethylene blends is also provided.

It is therefore an object of the present invention to enhance the processing characteristics of blends of polyethylenes wherein the blend components have at least one different rheological property.

It is another object of the present invention to provide a process for improving the processing characteristics of polyethylene blends employing recycled resin as a blend component.

It is yet another object of the present invention to provide a process to achieve enhanced bubble stability in blown film extrusion when extruding a polyethylene blend wherein the blend components have at least one different rheological property.

It is still another object of the present invention to reduce the level of downtime typically associated with the processing of polyethylene blends.

Other objects, aspects and the several advantages of the present invention will become apparent to those skilled in the art upon a reading of the specification and the claims appended thereto.

DESCRIPTION OF THE PREFERRED EMBODIMENTS

A wide variety of ethylene polymers are useful in the practice of the present invention. Improvements may be achieved when using branched ethylene polymers, linear ethylene polymers and mixtures of both as blend constituents. Additionally, it is within the scope of the present invention to utilize mixtures of ethylene polymers and non-ethylene polymers as blend constituents, so long as the major portion of such a constituent is ethylenic in nature. Preferred for use in the practice of the present invention are branched low density polyethylenes (LDPE), linear polyethylenes, including high density homopolymer (HDPE) and both high and low density copolymers of ethylene and mixtures thereof. The high density materials will generally have densities of at least 0.940 in the case of copolymers and generally, of at least 0.960 in the case of homopolymers. The effects are particularly good with linear, low density polyethylene (LLDPE), that is, with the copolymers of ethylene having minor amounts, typically up to 20 weight percent of a higher alpha-olefin comonomer such as butene, hexene, 4-methyl-pentene-1, octene, decene or dodecene produced by polymerization in the presence of a transition metal/aluminum alkyl catalyst. Linear low density polyethylenes of this kind will generally have a melt index (ASTM D-1238) less than 3 and a density of not more than 0.940, generally less than 0.930. Particularly preferred as blend constituents are LDPE and LLDPE resins.

When seeking to improve the processing characteristics of a proposed blend of ethylenic-based polymers in accordance with the present invention, it is essential to determine at least one resin parameter predictive of the rheological characteristics of the resin for each blend constituent. Such parameters include melt index, determined in accordance with ASTM D-1238, Standard Test Method for Flow Rates of Thermoplastic by Extrusion Plastometer, or equivalent, melt viscosity, also determined by ASTM D-1238, Brabender Plastograph, Monsanto Rheometer and the well known test to determine polymeric melt strength. Of these parameters, melt index is particularly preferred due in large part to its ease of determination and test precision.

Upon determining at least one rheological parameter for each component of a proposed blend, the matching of same is to be accomplished through the advantageous use of a free radical generator. Such free radical generators are typically those materials used in the free radical initiated polymerization of ethylene and other olefins. Generally, they will be either organic peroxides, peresters or organic azo compounds. Typical peroxy compounds include benzoyl peroxide, di-chlorobenzoyl peroxide, dicumyl peroxide, di-tert-butyl peroxide, 4,5-dimethyl-2,5-di(peroxy benzoate)hexyne-3, 1,3-bis(tert-butyl peroxy isopropyl)benzene, lauroyl peroxide, tert-butyl peracetate, 2,5-dimethyl-2,5-di(tert-butylperoxy)-hexyne-3, 2,5-dimethyl 2,5-di(tert-butyl-peroxy)hexane and tert-butyl peroenzoate. Azo compounds, such as azobisisobutyronitrile and dimethylazodiisobutyrate, are also operable. Dicumyl peroxide and 2,5-dimethyl-2,5-di-(tert-butyl-peroxy) hexane (DBPH) are the preferred free radical generators; with DBPH particularly preferred in the practice of the present invention due to its high activation temperature which enables better peroxide dispersion in the polymer before it is activated. By providing better peroxide dispersion, the occurrence of gelled polymer caused by a localized high concentration of peroxide, is avoided.

The amount of free radical generator required will depend upon several factors, including the rheological properties of the blend components and the response of the component or components to be treated with the free radical generator. Generally, the amount of free radical generator required to cause a blend component to exhibit a rheological property substantially similar to another blend component or components will be within the range of about 0.01 to about 5.0 weight percent and usually within about 0.025 to about 2.0 weight percent.

The free radical generator may also be used with an unsaturated organic silane compound which contains at least two hydrolyzable organic radicals. Thus, the preferred organic silane compounds have the formula RR'SiY$_2$, where R is a monovalent, olefinically unsaturated hydrocarbon or hydrocarbonoxy radical such as vinyl, allyl, butenyl, cyclohexenyl, cyclopentadienyl, cyclohexadienyl or alkyl or oxyalkyl groups with an acrylic or methacrylic substituent. R' is Y or a monovalent hydrocarbon radical such as an alkyl group, e.g., methyl, ethyl, propyl, tetradecyl, octadecyl, or an aryl group such as phenyl, benzyl or tolyl. Y is a hydrolyzable organic radical such as an alkoxy group such as methoxy, ethoxy, propoxy or butoxy, acyloxy such as formyloxy, acytoxy and propianoxy, an oximino group, an alkyl amino group or an aryl amino group. The preferred silane compounds are the vinyl silanes, particularly the vinyl trialkoxy silanes such as vinyl trimethoxysilane and vinyl triethoxysilane. The silane compound, if used, will generally be used in an amount from 0.01 to 5.0, preferably 0.025 to 2.0, percent by weight based on the total weight of the polymer blend component.

When the silane compound is used, a silanol condensation catalyst is preferably included such as dibutyltin dilaurate, stannous acetate, dibutyltin diacetate, dibutyltin dioctoate, lead naphthenate, zinc caprylate, cobalt naphthenate, tetrabutyl titanate, tetranonyl titanate, lead stearate, zinc stearate, cadmium stearate, barium stearate, and calcium stearate. The most preferred catalysts are the organic tin compounds for example, dibutyltin dilaurate, dibutyltin diacetate, and dibutyltin dioctoate. The condensation catalyst should preferably be present in a quantity within the range of 0.05 to 0.5 weight percent of the polyolefin blend component.

The process of the present invention comprises, in its essential elements, the matching of at least one rheological property of the polymeric components of a blend. By matching it is meant that at least one rheological property of a blend component is caused to be substantially similar to other blend components. For example, in accordance with the present invention, when melt index is used as the rheological parameter to be "matched", it is preferred that the melt index values for the various blend constituents be brought to within about 0.5 grams/10 minutes of each other. It is more preferred that the melt index values of the blend constituents be brought to within about 0.2 grams/10 minutes of each other and still more preferred that such values be brought to within about 0.1 grams/10 minutes of each other. It has now been discovered, that by so doing, improved blend processing is achieved.

To determine the amount of free radical generator and silane compound, if used, required to "match" a blend component to other blend components, the response of the component to the free radical generator or free radical generator plus silane compound is to be determined. In a simple case, wherein only two polyethylenes and a free radical generator is to be employed, the melt indices of the two polyethylenes are first determined. The polyethylene having the highest melt index (MI) would be selected for the free radical generator response study. In that study, at least three free radical generator dosages would be employed and the impact of same on MI would be determined. From this, a functional relationship between dosage and MI would be developed and the dosage level required to obtain a value of MI substantially similar to that of the other blend component selected from the relationship so developed would be determined.

In the treatment of a blend component, the free radical generator and the silane compound, if used, are reacted with the polymer blend component prior to blending. Reaction between the polymer and the other materials is carried out at an elevated temperature, generally from 100° to 250° C., preferably 150° to 200° C., under an inert atmosphere, e.g. nitrogen. Compounding time is suitable at least two minutes and generally will not exceed ten minutes at the specified temperatures, although the treatment time will generally vary inversely according to the temperature selected. Compounding may be carried out in an extruder or a suitable compounder such as a Brabender (trademark) mixer or a Banbury mixer which will reduce the resin to a plastic mass at an appropriate temperature for reaction with the free radical generator and the silane, if present. The preferred apparatus for carrying out the compounding step is a twin-screw extruder. The use of the twin-screw extruder has been found to enhance and promote the thorough dispersion of free radical generator, minimizing the occurrence of gelled polymer.

Once a blend component has been prepared, it may be compounded with the other unmodified polymer blend components. Other polymeric materials, e.g., elastomers, rubbers and other ingredients such as fillers, pigment additives, e.g. antioxidants may be present in order to impart desired properties to the final blend.

The use of the process of the present invention has, as previously mentioned, a number of advantages. First, when extruding the blends of polyolefin-based materials, it enables the resin blend to be extruded under more favorable conditions, using higher extrusion rates in continuous extrusion processes such as slot casting of film and tubular film blowing. In blown film extrusion, the frost line marking the boundary between the molten and crystallized resins will be lower because of the higher crystallization rate and temperature of the overall blend and this, in itself, indicates the potential for faster extrusion rates. In non-continuous operations such as injection molding, cycle times may be shortened since crystallization will take place more swiftly than with the unmodified polymer blend. Additionally, bubble stability in the blown film extrusion method is improved by the process of the present invention, further enhancing processing speeds.

Another benefit accruing from the practice of the present invention is the enhanced ability to utilize increased amounts of recycled (non-virgin) resin. These low cost materials are generally marketed using broad characterizations such as 2 MI mixed polyethylenes or mixed LLDPE's and the like. Such resins are advantageously used as virgin resin extenders in amounts not detracting from the final product or processing economics. Due to the fluctuation in the rheological properties of such recycled resins, their use is often limited to minor amounts. Through the practice of the process of the present invention higher percentages of recycled resin may be tolerated. As envisioned, the recycled resin would be studied for its response to either a free radical generator or a free radical generator plus silane, as described above. From this response study, a treatment level is selected to provide a treated resin having at least one rheological property substantially similar to the other blend component or components, which may include virgin resin. Higher recycle percentages may thus be utilized in the blend, with no loss in processing economics.

The resin blends produced according to this invention, may be fabricated according to general procedures, e.g. injection molding, slot casting and blown tubular film production but the properties of the blends will generally permit faster production rates to be used, as described above, together with other advantages as previously mentioned.

The invention is illustrated by the following non-limiting example in which all proportions and percentages are by weight unless the contrary is stated.

EXAMPLE

This experiment was carried out on a Brabender twin-screw extrusion device using Mobil MLA-043 linear low density polyethylene (LLDPE). Two peroxides were used: Vanderbilt Varox DCP-40C and Varox DBPH-50. The peroxides were mixed with the LLDPE on a parts per million basis. Several peroxide concentrations were tried to illustrate the ability to sufficiently modify the flow behavior of the polymer. The flow property used to determine the effect of the peroxide was the melt index test, in this case the I2 conditions.

The free radical treatments were carried out by feeding the polyethylene of known rheological (flow) properties to an extrusion device at a known throughput rate. At the same time, a quantity of the organic peroxide, sufficient to cause chemical crosslinking, but not so much that the thermoplastic polyethylene becomes a thermosetting (non-flowing) polymer, is fed into the extrusion device. The polymer and peroxide are mixed in the extruder, which also melts the polymer. The polymer/peroxide blend is then heated in the extruder to effect the crosslinking reaction. The time the polymer/peroxide blend spends in the extruder is calculated to be, at a minimum, long enough to achieve a complete reaction. A complete reaction is defined by those skilled in the art as ten (10) half lives for the peroxide reaction.

The data generated are as follows:

TABLE 1

| Polyethylene Resin | Peroxide | Peroxide Level (ppm) | Melt Index I2 (g/10 min) |
|---|---|---|---|
| MLA-043[1] | None | 0 | 2.30 |
| MLA-043 | DCP-40C[2] | 500 | 0.91 |
| MLA-043 | DCP-40C | 1000 | 0.85 |
| MLA-043 | DCP-40C | 1500 | 0.80 |
| MLA-043 | DCP-40C | 2000 | 0.35 |
| MLA-043 | DBPH-50C[3] | 500 | 0.73 |
| MLA-043 | DBPH-50C | 1000 | 0.16 |
| MLA-043 | DBPH-50C | 1500 | 0.07 |
| MLA-043 | DBPH-50C | 2000 | 0.03 |

[1] MLA-043 is a 2.3 MI LLDPE obtained from Mobil Chemical Company
[2] DCP-40C is a dicumyl peroxide, obtained from the R. T. Vanderbilt Company, Inc. of Norwalk, CT.
[3] DBPH-50C is a 50% 2,5-dimethyl-2,5-di(tert-butyl-peroxy)-hexane in mineral carrier, obtained from the R. T. Vanderbilt Company of Norwalk, CT As shown, the flow properties of the polyethylene have been significantly modified by this treatment.

Once the peroxide-melt index relationship is known, the correct proportion of peroxide can be selected to modify the polyethylene to achieve a melt index on the order of the other grade of polyethylene the processor wishes to blend the modified polymer with. For example, if a processor wished to extrude a blend of 60% 1 MI LLDPE with 40% MLA-043, he would choose to contact the MLA-043 with approximately 500 ppm DCP-40C prior to blending the two polyethylenes. By doing this, the effect upon the blown film process will be an increase in bubble stability, compared to a blend of 1 MI LLDPE and untreated MLA-043.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A method for improving the processing characteristics of a polyethylene blend wherein the blend is comprised of at least two polyethylene components of dissimilar melt indices, comprising the steps of:
   (a) establishing a functional relationship between free radical generator dosage and melt index for at least one polyethylene component of the polyethylene blend;

(b) determining a free radical generator dosage from said relationship for use with at least one polyethylene component, said dosage level sufficient to enable the polyethylene component so treated to exhibit a melt index substantially similar to that of all components present in the blend;

(c) treating at least one polyethylene component at the dosage of free radical generator determined in step (b); and (d) blending the polyethylene components in melt form.

2. The method of claim 1, wherein the free radical generator is an organic peroxide compound.

3. The method of claim 2, wherein the organic peroxide comprises 2,5-dimethyl-2,5-di(tert-butyl-peroxy)-hexane.

4. The method of claim 1, wherein the polyethylene blend components are selected from the group consisting of branched low density polyethylene, linear high density homopolymer of ethylene and linear copolymer of ethylene and an alpha olefin having 4 to 8 carbon atoms.

5. The method of claim 4, wherein said copolymer has a density of between about 0.90 to about 0.94 g/cc.

6. The method of claim 5, wherein in step (c), said treating step further comprises:
heating said ethylene polymer in melt form at a temperature of from about 230° C. to 340° C. in the presence of an effective amount of from 100 ppm to 2000 ppm of an organic peroxide for a period of time equal to at least three times the half-life of the organic peroxide at the heating temperature so utilized.

7. The process of claim 6 in which said ethylene polymer is treated for a period of time equal to at least five times the half-life of said organic peroxide at the treating temperature.

8. The method of claim 1, wherein in step (c), said treating step further comprises:
modifying the polyethylene by reaction with an unsaturated organic silane compound in the presence of the free radical generator.

9. The method of claim 8, wherein the silane compound is selected from the group consisting of vinyl trimethoxysilane and vinyl triethoxysilane.

10. A process for the extrusion of films from blends of mixed polyethylenes of dissimilar melt indices, comprising the steps of:
(a) establishing a functional relationship between free radical generator dosage and melt index for at least one polyethylene component of the polyethylene blend;

(b) determining a free radical generator dosage from said relationship for use with at least one polyethylene component, said dosage level sufficient to enable the polyethylene component so treated to exhibit a melt index substantially similar to that of all components present in the blend;

(c) treating at least one polyethylene component at the dosage of free radical generator determined in step (b); and (d) blending the polyethylene components in melt form; and (e) extruding the blend of step (d) into a film, wherein the extrusion characteristics exhibited in step (d) are improved over those obtained in a like process conducted without the treatment of step (c).

11. The process of claim 10, wherein the free radical generator is an organic peroxide compound.

12. The process of claim 11, wherein the said organic peroxide comprises 2,5-dimethyl-2,5-di(tert-butyl-peroxy)hexane.

13. The process of claim 12, wherein the polyethylene blend components are selected from the group consisting of branched low density polyethylene, linear high density homopolymer of ethylene and linear copolymer of ethylene and an alpha olefin having 4 to 8 carbon atoms.

14. The process of claim 13, wherein said copolymer has a density of between about 0.90 to about 0.94 g/cc.

15. The process of claim 14, wherein in step (c), said treating step further comprises:
heating said ethylene polymer in melt form at a temperature of from about 230° C. to 340° C. in the presence of an effective amount of from 100 ppm to 2000 ppm of an organic peroxide for a period of time equal to at least three times the half-life of the organic peroxide at the heating temperature so utilized.

16. The process of claim 15 in which said ethylene polymer is treated from a period of time equal to at least five times the half-life of said organic peroxide at the treating temperature.

17. The process of claim 10, wherein in step (c), said treating step further comprises:
modifying the polyethylene by reaction with an unsaturated organic silane compound in the presence of the free radical generator.

18. The process of claim 17, wherein the silane compound is selected from the group consisting of vinyl trimethoxysilane and vinyl triethoxysilane.

* * * * *